US010267960B1

(12) United States Patent
Chang

(10) Patent No.: US 10,267,960 B1
(45) Date of Patent: Apr. 23, 2019

(54) CLOAKING DEVICE AND APPARATUS

(71) Applicant: GM GLOBAL TECHNOLOGY OPERATIONS LLC, Detroit, MI (US)

(72) Inventor: Kai-Han Chang, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/888,404

(22) Filed: Feb. 5, 2018

(51) Int. Cl.
*F41H 3/00* (2006.01)
*G02B 5/04* (2006.01)

(52) U.S. Cl.
CPC ........ *G02B 5/04* (2013.01); *F41H 3/00* (2013.01)

(58) Field of Classification Search
CPC .............. F41H 3/00; G02B 6/34; G02B 5/04
USPC ................................. 359/831, 837; 385/37
See application file for complete search history.

(56) References Cited

U.S. PATENT DOCUMENTS

| | | | | |
|---|---|---|---|---|
| 5,392,161 | A | * | 2/1995 | Weder .................. A63H 33/22 359/861 |
| 8,233,204 | B1 | | 7/2012 | Robbins et al. |
| 9,405,118 | B1 | * | 8/2016 | Lu ...................... G02B 27/00 |
| 9,994,154 | B1 | * | 6/2018 | Takagi .................. B60R 1/007 |
| 2011/0242102 | A1 | | 10/2011 | Hess |
| 2014/0063055 | A1 | | 3/2014 | Osterhout et al. |
| 2014/0292811 | A1 | | 10/2014 | Takayama |
| 2015/0193664 | A1 | | 7/2015 | Marti et al. |
| 2016/0025956 | A1 | * | 1/2016 | Choi ................... G02B 17/008 359/730 |
| 2017/0043719 | A1 | | 2/2017 | Wippler |
| 2017/0161949 | A1 | | 6/2017 | Seder et al. |
| 2017/0227781 | A1 | | 8/2017 | Banerjee et al. |

OTHER PUBLICATIONS

Aiden Taylor, "Jaguar Land Rover reveals transparent pillar technology," Dec. 17, 2014, http://www.carsguide.com.au/car-news/jaguar-land-rover-reveals-transparent-pillar-technology-video-30528.
Pankaj Kumar, K. K. Raina, "Morphological and electro-optical responses of dichroic polymer dispersed liquid crystal films," ScienceDirect, Feb. 9, 2007, http://www.sciencedirect.com.
Univision Autos, "MINI Augmented Vision Powered by MINI Connected," May 6, 2015, https://www.youtube.com/match?v=DyjOt-GUJhs.

* cited by examiner

*Primary Examiner* — William C. Dowling
(74) *Attorney, Agent, or Firm* — Quinn IP Law

(57) ABSTRACT

A cloaking device includes a prism and a light guide. The prism is attachable to an article and is configured for directing around the article a light ray reflected from an object that is blocked from view. The prism has an object surface and an article surface spaced opposite the object surface. The guide is disposed on solely the object surface and has a refraction surface at least partially spaced apart from the object surface. The guide is configured for directing the ray through the prism such that the object is not blocked from view. The refraction surface and the ray define a first angle therebetween of less than 90°. The guide is formed from a first transparent material having a first refractive index and the prism is formed from a second transparent material having a second refractive index that is greater than or equal to the first refractive index.

20 Claims, 3 Drawing Sheets

CLOAKING DEVICE AND APPARATUS

INTRODUCTION

The disclosure relates to a cloaking device and to an apparatus that includes the cloaking device.

An observer may experience a restricted or altogether obscured view of an object during operation of a device or while observing an event. For example, the observer may be unable to recognize an object that is blocked from view by an article disposed between the observer and the object. Such blocked objects may interfere with operation of the device or may detract from enjoyment of the event.

SUMMARY

A cloaking device includes a prism attachable to an article and configured for directing around the article a light ray reflected from an object that is blocked from view by the article. The prism has an object surface and an article surface spaced opposite the object surface. The cloaking device also includes a light guide disposed on solely the object surface and having a refraction surface at least partially spaced apart from the object surface. The light guide is configured for directing the light ray through the prism such that the object is not blocked from view by the article. The refraction surface and the light ray define a first angle therebetween of less than 90°. The light guide is formed from a first transparent material having a first refractive index, and the prism is formed from a second transparent material having a second refractive index that is greater than or equal to the first refractive index.

In one aspect, the light guide may be further formed from a third transparent material having a third refractive index that is less than the first refractive index. The third refractive index may be greater than or equal to a refractive index of air. The first refractive index and the second refractive index may each be greater than 1.5. The first transparent material may be polycarbonate, the second transparent material may be polycarbonate, and the third transparent material may be poly(methyl methacrylate).

In another aspect, the first transparent material may abut the third transparent material at an interface surface. Further, the interface surface and the object surface may define a second angle therebetween of from 5° to 45°. The refraction surface may be parallel to the object surface. The refraction surface may be parallel to the article surface. The light ray and a normal ray perpendicular to the refraction surface may define an angle of incidence therebetween of less than 90°. Further, the first angle and the angle of incidence may be complementary angles.

The light guide may not be disposed on the article surface. The light guide may redirect the light ray through the first transparent material and the third transparent material as a refracted ray such that the object surface and the normal ray define an angle of refraction therebetween that is less than the angle of incidence. In one aspect, the first transparent material may be polycarbonate, the second transparent material may be polycarbonate, the third transparent material may be poly(methyl methacrylate), and the angle of refraction may be less than or equal to 35°. The angle of refraction may be 30° when the angle of incidence is 60°. The angle of refraction may be 35° when the angle of incidence is from 85° to 89°.

In a further aspect, the light ray may have a first luminance and the refracted ray may have a second luminance that is at least equal to the first luminance.

In one embodiment, a cloaking device includes a prism attachable to an article and configured for directing around the article a light ray reflected from an object that is blocked from view by the article. The prism has an object surface and an article surface spaced opposite the object surface. The cloaking device also includes a light guide disposed on solely the object surface and having a refraction surface spaced apart from and disposed parallel to the object surface. The light guide is configured for directing the light ray through the prism such that the object is not blocked from view by the article. The refraction surface and the light ray define a first angle therebetween of less than 90°. Further, the light ray and a normal ray perpendicular to the refraction surface define an angle of incidence therebetween of less than 90°. The light guide is formed from a first transparent material having a first refractive index and a third transparent material having a third refractive index that is less than the first refractive index. The light guide redirects the light ray through the first transparent material and the third transparent material as a refracted ray such that the object surface and the normal ray define an angle of refraction therebetween that is less than the angle of incidence. The prism is formed from a second transparent material having a second refractive index that is greater than or equal to the first refractive index. The first refractive index and the second refractive index are each greater than 1.5 and the third refractive index is greater than or equal to a refractive index of air. The light ray has a first luminance and the refracted ray has a second luminance that is at least equal to the first luminance.

An apparatus includes an article and a cloaking device attached to the article. The cloaking device includes a prism configured for directing around the article a light ray reflected from an object that is blocked from view by the article. The prism has an object surface facing the object and an article surface spaced opposite the object surface and facing the article. The cloaking device also includes a light guide disposed on solely the object surface and having a refraction surface at least partially spaced apart from the object surface. The light guide is configured for directing the light ray through the prism such that the object is not blocked from view by the article. The refraction surface and the light ray define a first angle therebetween of less than 90°. The light guide is formed from a first transparent material having a first refractive index and the prism is formed from a second transparent material having a second refractive index that is greater than or equal to the first refractive index.

In one aspect, the prism may be attached to the article such that the prism is disposed between the article and the light guide.

DETAILED DESCRIPTION

Figure 1:
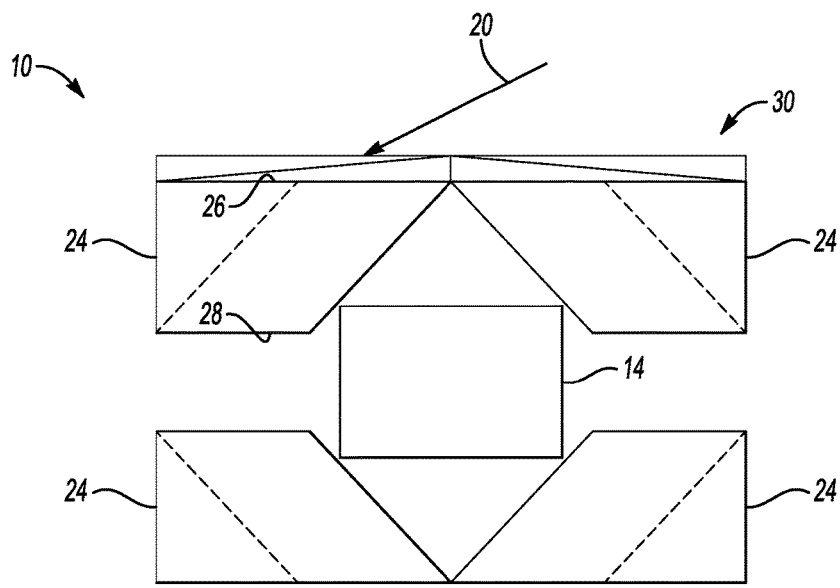
FIG. 1 is a schematic illustration of a top view of a cloaking device that includes a prism and a light guide disposed on the prism.
Figure 2:
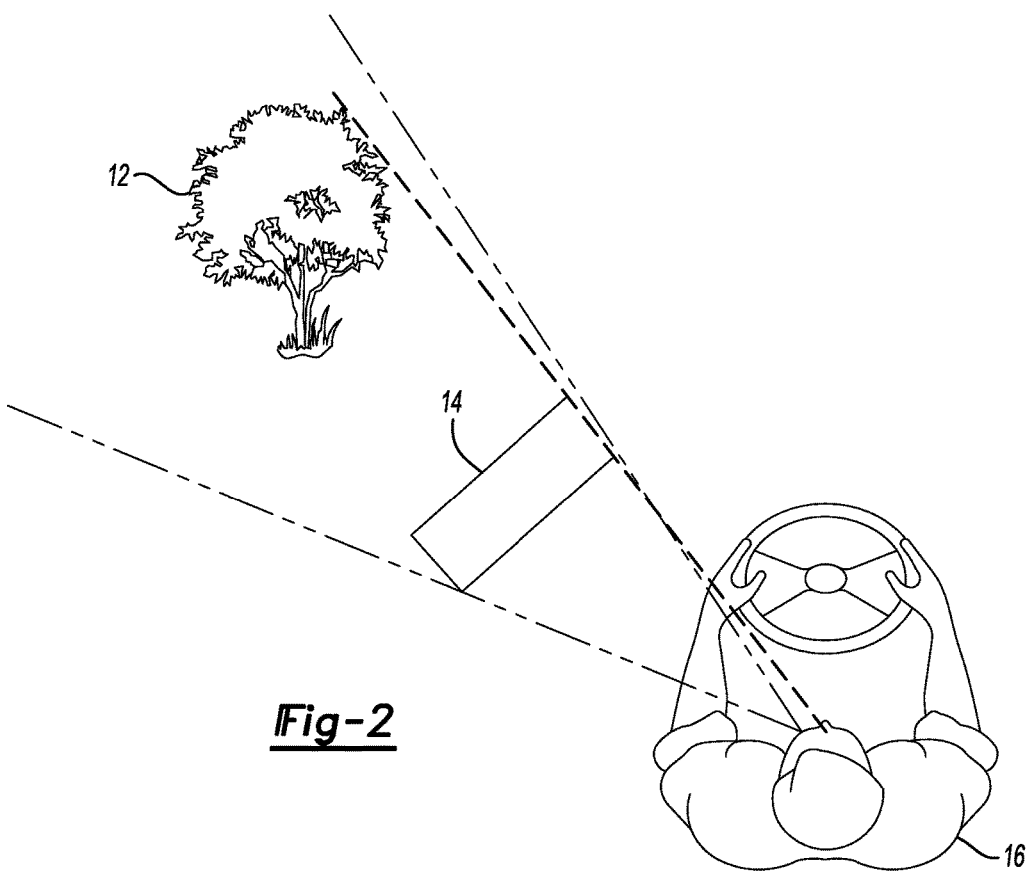
FIG. 2 is a schematic illustration of a top view of an object that is blocked from an observer's view by an article.

Referring to the Figures, wherein like reference numerals refer to like elements, a cloaking device 10 is shown generally in FIG. 1. As described with reference to FIG. 2, the cloaking device 10 may be useful for applications in which an object 12 is obscured from view by an article 14 such that an observer 16 cannot perceive the object 12 from a viewpoint behind the article 14. For example, the cloaking device 10 may be a component of an apparatus 18 (FIG. 5) and may be useful for vehicular applications in which the object 12 is a tree, animal, road sign, or traffic flow device disposed external to the apparatus 18, and the article 14 is an A-pillar that defines a passenger compartment of the apparatus 18. Alternatively, the cloaking device 10 may be useful for non-vehicular applications in which the object 12 is blocked from view by the article 14, such as, but not limited to, a blind corner, obstructed theater or stadium seating, and the like. For these applications, the object 12 may be, for example, an approaching obstacle, a stage set, or a sport ball, and the article 14 may be a building corner, a support pillar, or seating disposed between the object 12 and the observer 16.

Figure 5:
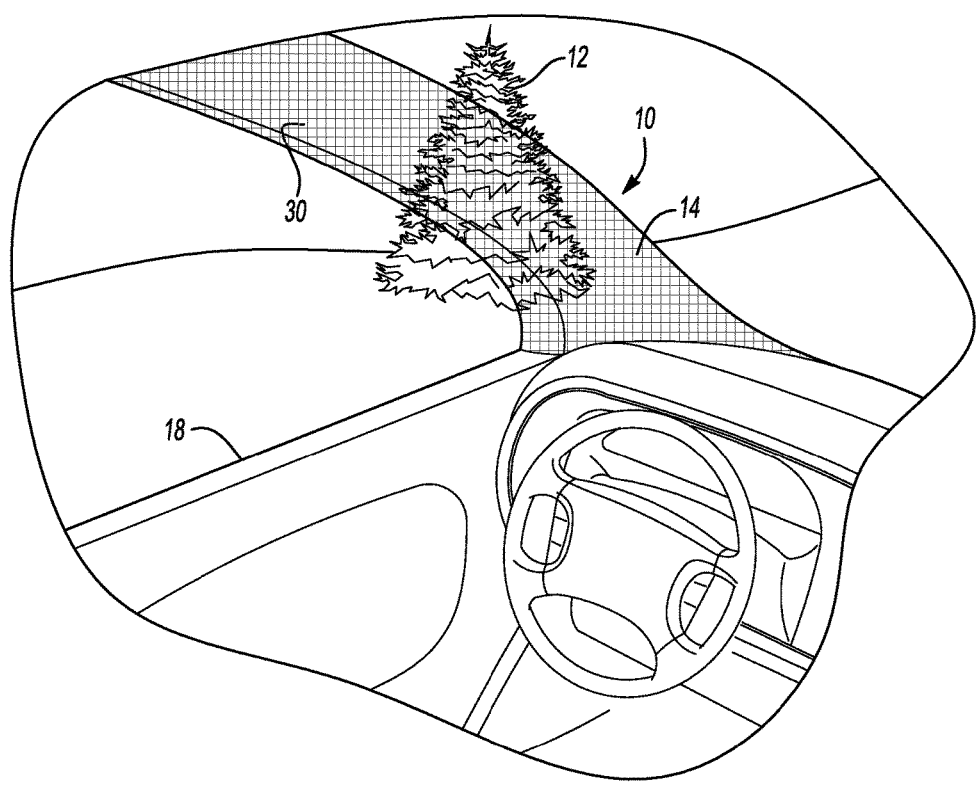
FIG. 5 is a schematic illustration of a perspective view of an apparatus that includes the cloaking device of FIGS. 1, 3, and 4, wherein the object of FIG. 2 is not blocked from view by the article of FIG. 2.

As set forth in more detail below and as shown in FIG. 5, the cloaking device 10 allows the observer 16 to perceive or view the object 12 blocked by the article 14 such that the article 14 appears transparent and the object 12 is visible to the observer 16. In particular, the cloaking device 10 may be especially suitable for applications in which a light ray 20 (FIG. 3) reflected from the object 12 intercepts the cloaking device 10 at an oblique angle, i.e., at an angle that is not perpendicular to an external surface of the cloaking device 10. The cloaking device 10 may improve the quality of an image of the object 12 viewable by the observer 16 such that the object 12 is visible from many viewing angles and has excellent luminance.

In one non-limiting embodiment described with reference to FIG. 5, the apparatus 18 includes the article 14 and the cloaking device 10 attached to the article 14. The cloaking device 10 may be attached to an external surface of the A-pillar or other component of the apparatus 18 such that the cloaking device 10 faces the object 12 that is external to and spaced apart from the apparatus 18.

Figure 4:
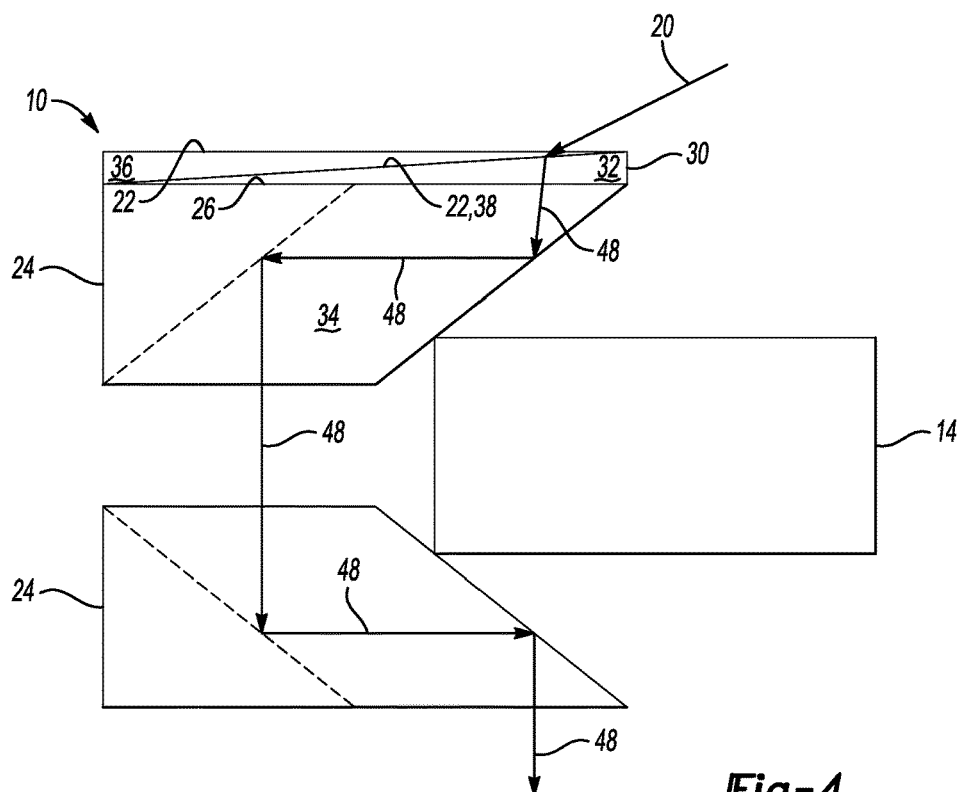
FIG. 4 is a schematic illustration of a top view of another portion of the cloaking device of FIGS. 1 and 3.

Referring again to FIG. 1, the cloaking device 10 includes a prism 24 attachable to the article 14 and configured for directing around the article 14 the light ray 20 reflected from the object 12 (FIG. 2) that is blocked from view by the article 14. That is, as best shown in FIG. 4, which depicts one portion or half of the cloaking device 10, the prism 24 may redirect the light ray 20 reflected from the object 12 around the article 14. The prism 24 may include one or more mirrors or lenses and may include one or more surfaces angled with respect to the article 14 so that the light ray 20 may bounce or refract and redirect within the prism 24. In addition, the prism 24 has an object surface 26 facing the object 12 and an article surface 28 spaced opposite the object surface 26 and facing the article 14.

As described with continued reference to FIG. 1, the cloaking device 10 also includes a light guide 30 disposed on solely or only the object surface 26. That is, the light guide 30 may not be disposed on the article surface 28. For example, for vehicular applications, the light guide 30 and prism 24 may be attached to the article 14 on an exterior of the vehicle or apparatus 18. In particular, the prism 24 may be attached to the article 14 such that the prism 24 is disposed between the article 14 and the light guide 30. Further, the light guide 30 may be spaced apart from the article 14 and may face the object 12 that is disposed external to the apparatus 18. The light guide 30 is configured for directing the light ray 20 through the prism 24 such that the object 12 is not blocked from view by the article 14.

Figure 3:
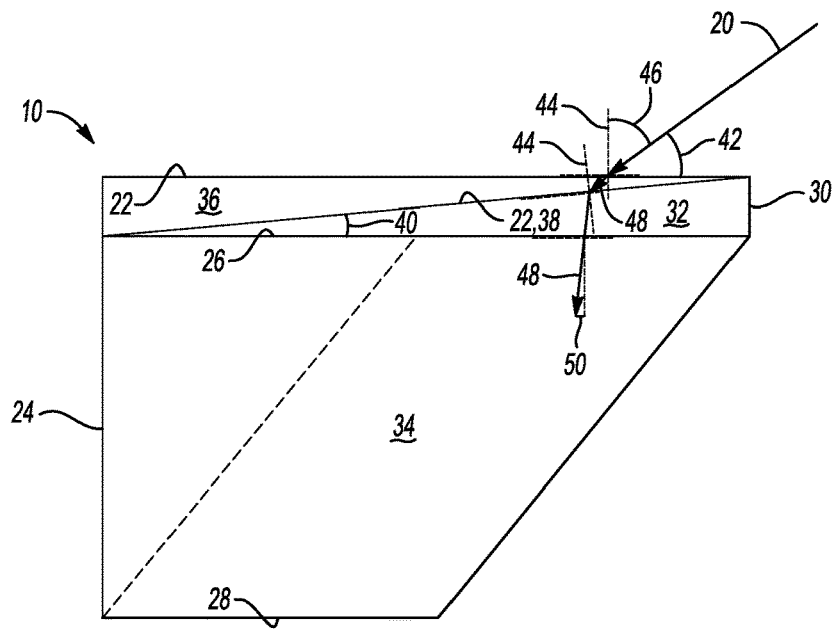
FIG. 3 is schematic illustration of a top view of a portion of the cloaking device of FIG. 1.

Referring now to FIG. 3, the light guide 30 is formed from a first transparent material 32 having a first refractive index and the prism 24 is formed from a second transparent material 34 having a second refractive index that is greater than or equal to the first refractive index. That is, the first refractive index may be less than or equal to the second refractive index so that the light guide 30 may reduce internal reflection in the cloaking device 10 and effectively redirect the light ray 20 through the prism 24. Stated differently, if the second refractive index is less than the first refractive index, the light guide 30 cannot effectively direct the light ray 20 through the prism 24 and the object 12 may still appear blocked from view by the article 14.

In some embodiments, the first refractive index and the second refractive index may each be greater than 1.5 to maximize redirection and transmission of the light ray 20 through the prism 24. For example, the first refractive index and the second refractive index may be equal to about 1.56, the first transparent material 32 may be polycarbonate, and the second transparent material 34 may also be polycarbonate.

The light guide 30 may be further formed from a third transparent material 36 having a third refractive index that is less than the first refractive index. That is, the first refractive index may be greater than the third refractive index so that the light guide 30 may effectively redirect the light ray 20 through the prism 24. Stated differently, if the third refractive index is greater than or equal to the first refractive index, the light guide 30 cannot effectively direct the light ray 20 through the prism 24 and the object 12 may still appear blocked from view by the article 14.

In some embodiments, the third refractive index may be greater than or equal to a refractive index of air, i.e., greater than or equal to 1, so that the light ray 20 can transmit through the prism 24. For example, the third refractive index may be 1.48 and the third transparent material 36 may be poly(methyl methacrylate).

As best shown in FIG. 3, for embodiments including the third transparent material 36, the first transparent material 32 may abut the third transparent material 36 at an interface surface 38. The interface surface 38 and the object surface 26 may define a second angle 40 therebetween of from 5° to 45°. That is, the first transparent material 32 and the third transparent material 36 may be shaped as complementary wedges that abut at the interface surface 38. At second angles 40 of less than 5° or greater than 45°, the light guide 30 may not accurately bend or direct the light ray 20 through the prism 24 and the object 12 may still appear blocked from view by the article 14. That is, the second angle 40 of from 5° to 45° allows the light guide 30 to refract the light ray 20 through the prism 24 along a desired path suitable for producing an image of the object 12 viewable by the observer 16, even when the light ray 20 intersects the light guide 30 at an oblique angle, i.e., at an angle not perpendicular to the light guide 30.

More specifically, as described with continued reference to FIG. 3, the light guide 30 also has a refraction surface 22 at least partially spaced apart from the object surface 26. In one embodiment in which the light guide 30 is formed from only the first transparent material 32, the refraction surface 22 may intersect the object surface 26 at one end and may be spaced apart from the object surface 26 at an opposite end. In other embodiments in which the light guide 30 is formed from the first transparent material 32 and the third transparent material 36, the refraction surface 22 may be parallel to the object surface 26. Likewise, the refraction surface 22 may be parallel to the article surface 28.

Therefore, for embodiments including the third transparent material 36, the first transparent material 32 and the third transparent material 36 may be configured such that the refraction surface 22 presents a flat exterior surface. Alternatively, for embodiments in which the light guide 30 is only formed from the first transparent material 32, the refraction surface 22 may be slanted or angled with respect to the object surface 26.

Further, as described with continued reference to FIG. 3, the refraction surface 22 and the light ray 20 define a first angle 42 therebetween of less than 90°. That is, the light ray 20 may intersect the refraction surface 22 to define an oblique angle therebetween. Therefore, the cloaking device 10 may not be limited to applications in which the object 12 is disposed with respect to the article 14 so as to only reflect a light ray 20 that is perpendicular to the refraction surface 22. Rather, the light guide 30 and cloaking device 10 effectively redirect light rays 20 that define the oblique first angle 42 with the refraction surface 22 so that the article 14 appears transparent and the object 12 is visible to the observer 16, even when the object 12 is otherwise physically blocked from view by the article 14.

Referring to FIG. 3, the light ray 20 and a normal ray 44 perpendicular to the refraction surface 22 may define an angle of incidence 46 therebetween of less than 90°. That is, the angle of incidence 46 may be an oblique angle. Therefore, the first angle 42 and the angle of incidence 46 may be complementary angles.

During operation and as best shown in FIGS. 3 and 4, the light guide 30 may redirect the light ray 20 through the first transparent material 32 and the third transparent material 36 as a refracted ray 48 such that the object surface 26 and the normal ray 44 define an angle of refraction 50 therebetween that is less than the angle of incidence 46. That is, the light guide 30 may decrease the angle of refraction 50 so that the refracted ray 48 strikes and reflects off the mirrors or angled surfaces of the prism 24 and properly redirects around the article 14, e.g., along a desired path labeled at 48 in FIG. 4. A decreased angle of refraction 50 may further ensure that the refracted ray 48 is not scattered away from the observer 16 but is instead received by the observer 16.

In particular, for embodiments in which the first transparent material 32 is polycarbonate, the second transparent material 24 is polycarbonate, and the third transparent 36 material is poly(methyl methacrylate), the angle of refraction 50 may be less than or equal to 35° so that the light guide 30 may effectively redirect the light ray 20 through the prism 24. Stated differently, if the angle of refraction 50 is greater than 35°, the light guide 30 may not direct the light ray 20 through the prism 24 and the object 12 may still appear blocked from view by the article 14. For example, the angle of refraction 50 may be 30° when the angle of incidence 46 is 60° and the first transparent material 32, the second transparent material 34, and the third transparent material 36 are as described above. Further, the angle of refraction 50 may be 35° when the angle of incidence 46 is from 85° to 89°. Such angles of refraction 50 and incidence 46 may ensure that the refracted ray 48 is directed along the desired path within the prism 24 so that the object 12 is visible to the observer 16, i.e., that the article 14 appears transparent. As a comparison, the angle of refraction 50 may be, for example, 40° if the light guide 30 is not disposed on the prism 24 and the light ray 20 only directly enters the prism 24 at the object surface 26.

In addition, the light ray 20 may have a first luminance and the refracted ray 48 may have a second luminance that is at least equal to the first luminance. That is, the image viewable by the observer 16 may be bright and have excellent intensity. Stated differently, even for oblique angles of incidence 46, the second luminance of the refracted ray 48 may not diminish as the refracted ray 48 travels through the prism 24.

As described with reference to FIG. 4, during operation, the light guide 30, via at least the first transparent material 32, directs the light ray 20 through the prism 24 such that the object 12 (FIG. 5) is not blocked from view by the article 14 but instead is visible to the observer 16 as if the article 14 is transparent. That is, the light guide 30 directs the light ray 20 around the article 14 to the observer 16 so that the article 14 does not block the observer's 16 view of the object 12. Further, the light guide 30 allows for transmission of the light ray 20 and the refracted ray 48 having the excellent second luminance such that the intensity of the light ray 20 is not compromised or scattered to dull the image of the object 12.

As such, the cloaking device 10 allows the observer 16 to perceive or view the object 12 blocked by the article 14 such that the article 14 appears transparent and the object 12 is visible to the observer 16, even without the use of cameras and displays or metamaterials. In particular, the cloaking device 10 is especially suitable for applications in which the light ray 20 intercepts the cloaking device 10 at an oblique angle, i.e., at an angle that is not perpendicular to the refractive surface 22 of the cloaking device 10. The cloaking device 10 may improve the quality of the image viewable by the observer 16 such that the object 12 is visible from many viewing angles and has excellent luminance.

While the best modes for carrying out the disclosure have been described in detail, those familiar with the art to which this disclosure relates will recognize various alternative designs and embodiments for practicing the disclosure within the scope of the appended claims.

What is claimed is:

1. A cloaking device comprising:
   a prism attachable to an article and configured for directing around the article a light ray reflected from an object that is blocked from view by the article, wherein the prism has:
   an object surface; and
   an article surface spaced opposite the object surface; and
   a light guide disposed on solely the object surface and having a refraction surface at least partially spaced apart from the object surface, wherein the light guide is configured for directing the light ray through the prism such that the object is not blocked from view by the article;
   wherein the refraction surface and the light ray define a first angle therebetween of less than 90°; and
   wherein the light guide is formed from a first transparent material having a first refractive index and the prism is formed from a second transparent material having a second refractive index that is greater than or equal to the first refractive index.

2. The cloaking device of claim 1, wherein the light guide is further formed from a third transparent material having a third refractive index that is less than the first refractive index.

3. The cloaking device of claim 2, wherein the first refractive index and the second refractive index are each greater than 1.5.

4. The cloaking device of claim 3, wherein the first transparent material is polycarbonate, the second transparent material is polycarbonate, and the third transparent material is poly(methyl methacrylate).

5. The cloaking device of claim 2, wherein the third refractive index is greater than or equal to a refractive index of air.

6. The cloaking device of claim 2, wherein the first transparent material abuts the third transparent material at an interface surface.

7. The cloaking device of claim 6, wherein the interface surface and the object surface define a second angle therebetween of from 5° to 45°.

8. The cloaking device of claim 6, wherein the refraction surface is parallel to the object surface.

9. The cloaking device of claim 8, wherein the refraction surface is parallel to the article surface.

10. The cloaking device of claim 8, wherein the light ray and a normal ray perpendicular to the refraction surface define an angle of incidence therebetween of less than 90°.

11. The cloaking device of claim 10, wherein the light guide redirects the light ray through the first transparent material and the third transparent material as a refracted ray such that the object surface and the normal ray define an angle of refraction therebetween that is less than the angle of incidence.

12. The cloaking device of claim 11, wherein the first transparent material is polycarbonate, the second transparent material is polycarbonate, and the third transparent material is poly(methyl methacrylate); and
wherein the angle of refraction is less than or equal to 35°.

13. The cloaking device of claim 12, wherein the angle of refraction is 30° when the angle of incidence is 60°.

14. The cloaking device of claim 12, wherein the angle of refraction is 35° when the angle of incidence is from 85° to 89°.

15. The cloaking device of claim 12, wherein the light ray has a first luminance and the refracted ray has a second luminance that is at least equal to the first luminance.

16. The cloaking device of claim 1, wherein the light guide is not disposed on the article surface.

17. The cloaking device of claim 10, wherein the first angle and the angle of incidence are complementary angles.

18. A cloaking device comprising:
a prism attachable to an article and configured for directing around the article a light ray reflected from an object that is blocked from view by the article, wherein the prism has:
an object surface; and
an article surface spaced opposite the object surface; and
a light guide disposed on solely the object surface and having a refraction surface spaced apart from and disposed parallel to the object surface, wherein the light guide is configured for directing the light ray through the prism such that the object is not blocked from view by the article;
wherein the refraction surface and the light ray define a first angle therebetween of less than 90°;
wherein the light ray and a normal ray perpendicular to the refraction surface define an angle of incidence therebetween of less than 90°;
wherein the light guide is formed from a first transparent material having a first refractive index and a third transparent material having a third refractive index that is less than the first refractive index;
wherein the light guide redirects the light ray through the first transparent material and the third transparent material as a refracted ray such that the object surface and the normal ray define an angle of refraction therebetween that is less than the angle of incidence;
wherein the prism is formed from a second transparent material having a second refractive index that is greater than or equal to the first refractive index;
wherein the first refractive index and the second refractive index are each greater than 1.5 and the third refractive index is greater than or equal to a refractive index of air; and
wherein the light ray has a first luminance and the refracted ray has a second luminance that is at least equal to the first luminance.

19. An apparatus comprising:
an article;
a cloaking device attached to the article and including:
a prism configured for directing around the article a light ray reflected from an object that is blocked from view by the article, wherein the prism has:
an object surface facing the object; and
an article surface spaced opposite the object surface and facing the article; and
a light guide disposed on solely the object surface and having a refraction surface at least partially spaced apart from the object surface, wherein the light guide is configured for directing the light ray through the prism such that the object is not blocked from view by the article;
wherein the refraction surface and the light ray define a first angle therebetween of less than 90°; and
wherein the light guide is formed from a first transparent material having a first refractive index and the prism is formed from a second transparent material having a second refractive index that is greater than or equal to the first refractive index.

20. The apparatus of claim 19, wherein the prism is attached to the article such that the prism is disposed between the article and the light guide.

* * * * *